UNITED STATES PATENT OFFICE.

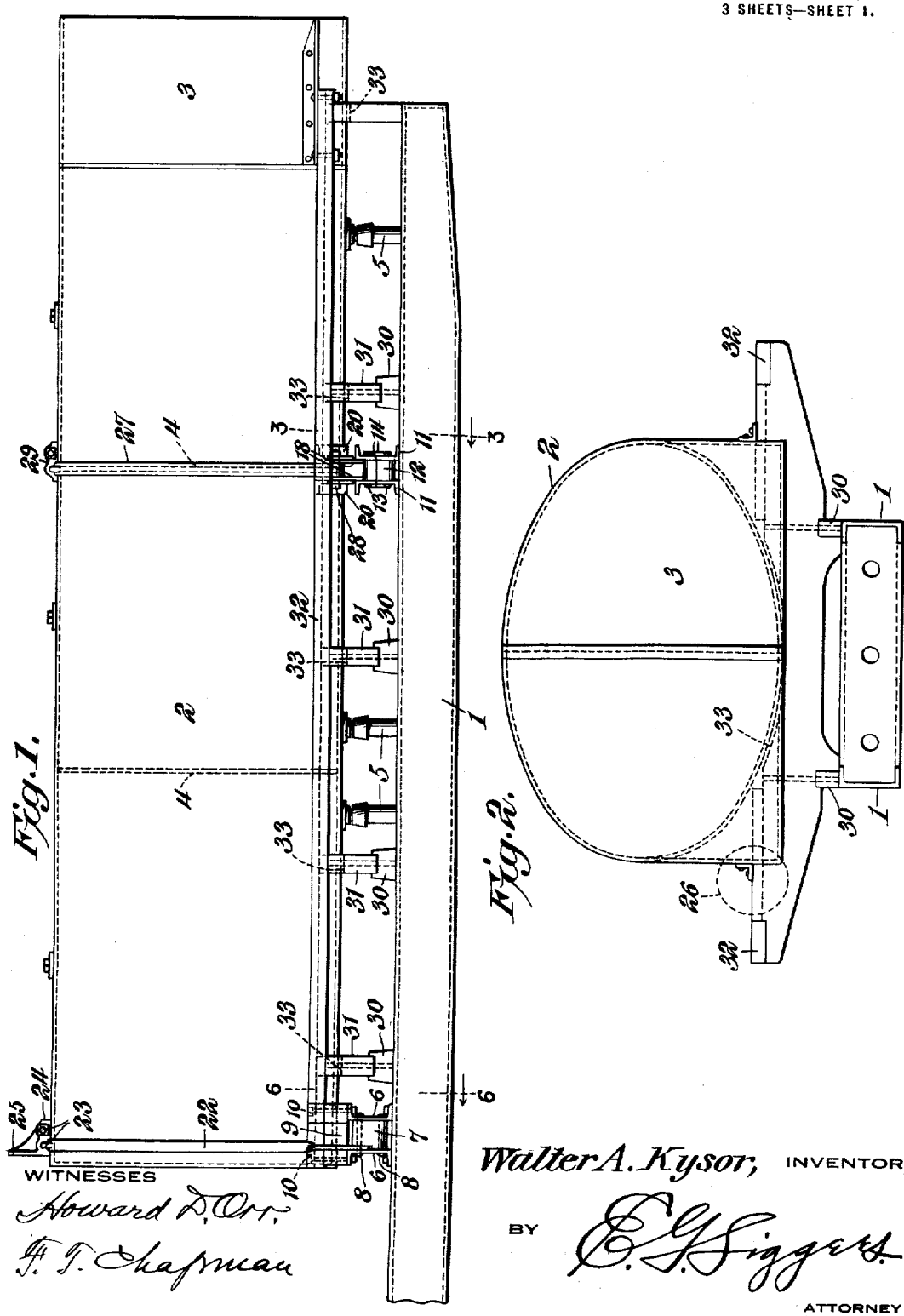

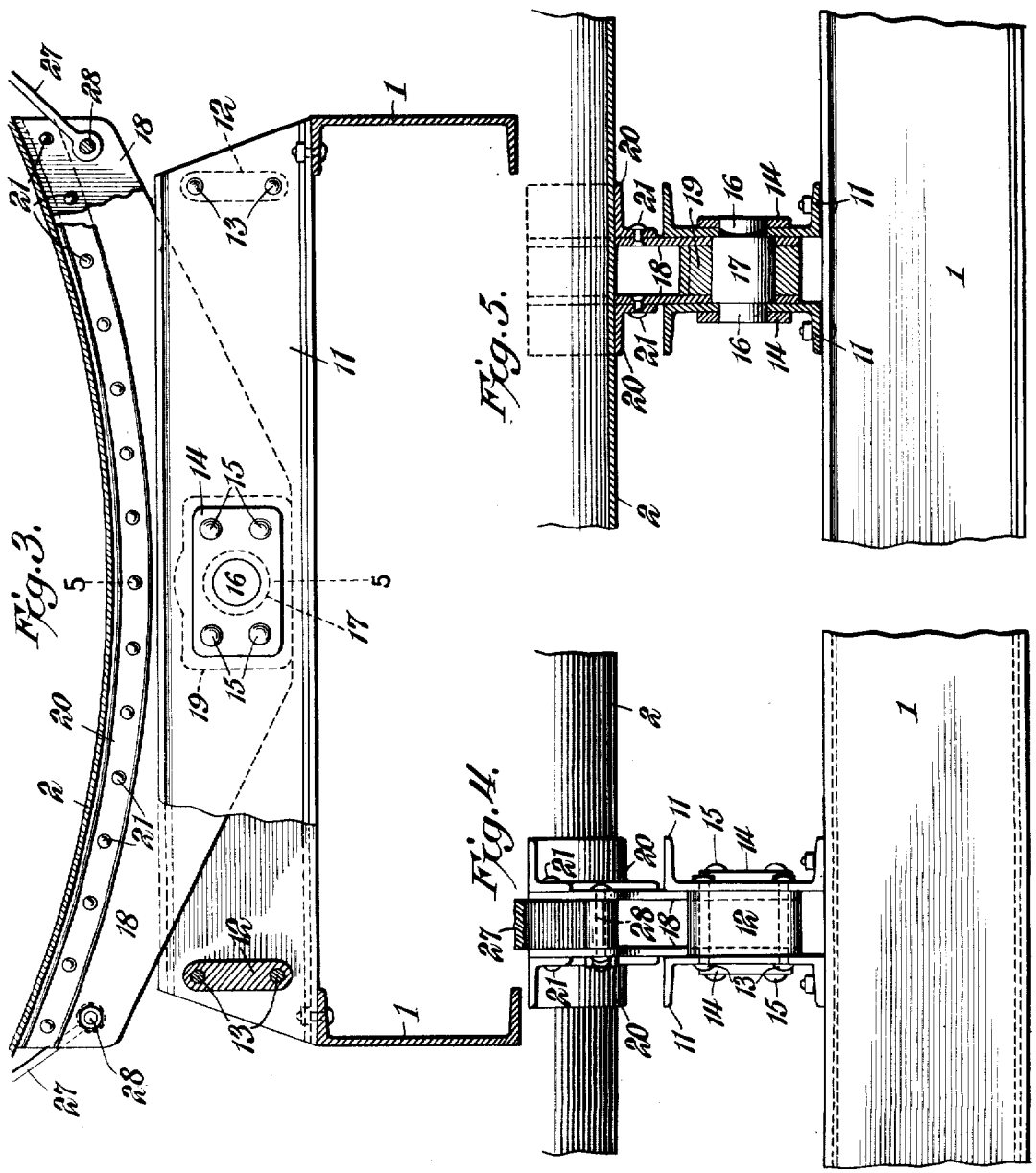

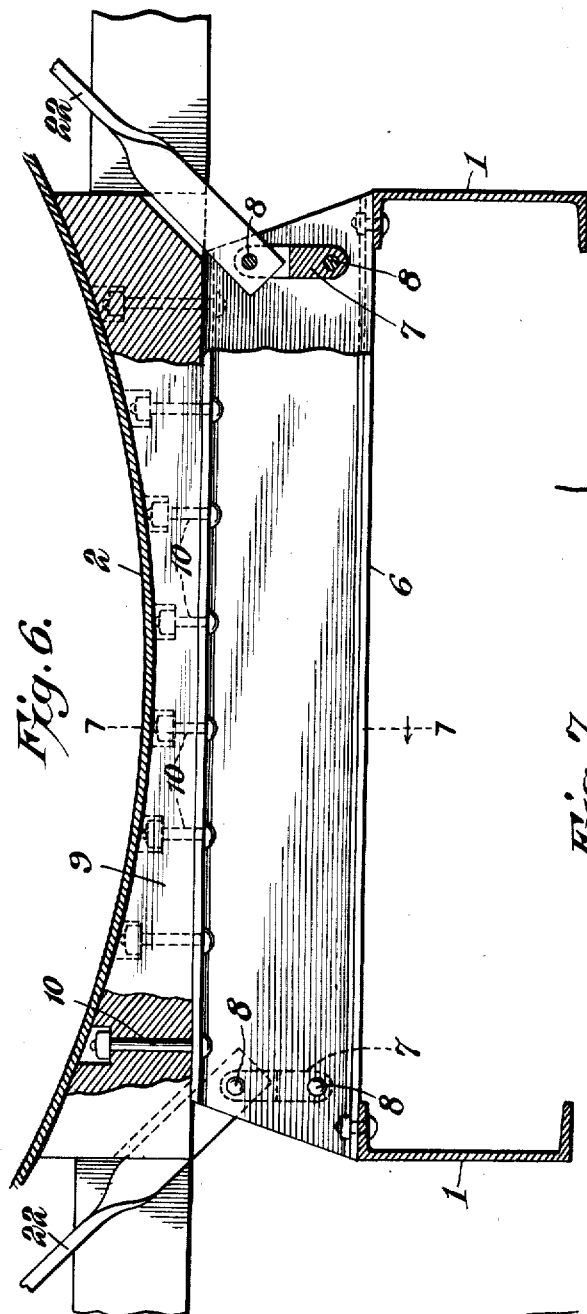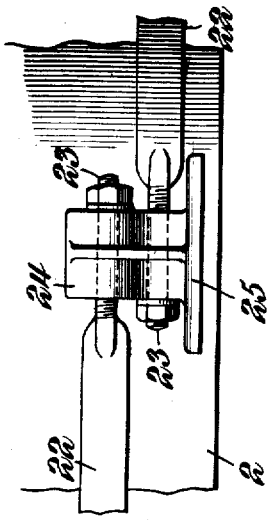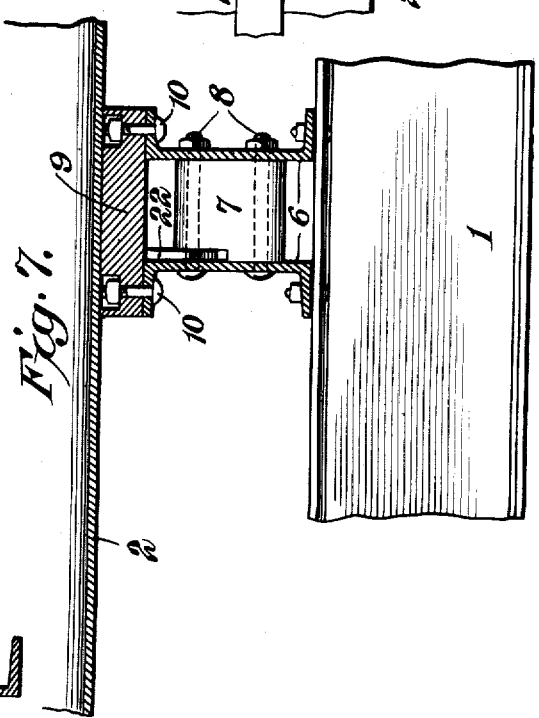

WALTER A. KYSOR, OF CADILLAC, MICHIGAN, ASSIGNOR TO ACME MOTOR TRUCK CO., OF CADILLAC, MICHIGAN, A CORPORATION OF MICHIGAN.

MOTOR-TRUCK CONSTRUCTION.

1,342,266.      Specification of Letters Patent.      Patented June 1, 1920.

Application filed November 5, 1918. Serial No. 261,200.

*To all whom it may concern:*

Be it known that I, WALTER A. KYSOR, a citizen of the United States, residing at Cadillac, in the county of Wexford and State of Michigan, have invented a new and useful Motor-Truck Construction, of which the following is a specification.

This invention has reference to motor truck construction, and has more particular reference to tank wagons or trucks.

The object of the invention is to mount and support the tank upon the running gear of the truck so that stresses and strains heretofore encountered and productive of leaks and chassis troubles are avoided.

In motor trucks carrying oil or other liquids it has heretofore been customary to rigidly attach the tank to the chassis so that even though the chassis did have a certain amount of flexibility, such flexibility was nullified by the tank, and the flexing of the chassis was productive of strains in the tank ultimately resulting in leaks.

In order to utilize the flexibility of the chassis without putting the tank under undue strains, the invention provides what may be termed a three-point connection of the tank to the chassis, whereby the normal rigidity of the tank in nowise interferes with the flexibility of the chassis and neither the tank nor the chassis is subjected to undue strains under ordinary running conditions.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a side elevation of a portion of a chassis and the tank of a tank motor truck, illustrating the invention, parts of the motor truck immaterial to the invention being omitted.

Fig. 2 is an end elevation of the right hand end of Fig. 1, also omitting parts which are not essential to the invention.

Fig. 3 is a section on the line 3—3 of Fig. 1 but drawn on a larger scale and also showing some parts broken away to disclose more distant parts.

Fig. 4 is an elevation of the structure shown in Fig. 3, as viewed from the right hand side thereof.

Fig. 5 is a section on the line 5—5 of Fig. 3.

Fig. 6 is a section on the line 6—6 of Fig. 1 drawn on a larger scale and having some parts broken away and in section.

Fig. 7 is a section on the line 7—7 of Fig. 6.

Fig. 8 is a plan view of a portion of the front end of the tank showing a connecting lug for a holding strap for the tank.

Referring to the drawings, there is shown a portion of a chassis of which side rails 1 only are indicated, other portions common to truck construction being omitted as unnecessary for an understanding of the invention.

Mounted on the chassis is a tank 2 such as is customarily used for transporting oil or other liquids from place to place. Such a tank may be of round or oval form in cross section and in the drawings the oval form is indicated, but it is to be understood that a tank round in cross section may be used if desired. The tank is of a length approximating that of the chassis and in the particular showing of the drawings a compartment 3 is provided at the rear end of the tank for inclosing valves and for housing various devices such as measuring vessels and the like used in conjunction with distributing tanks. Where the tanks are employed for local distribution of oil or the like the tank body may be divided into numerous compartments by partitions 4 and from each compartment a duct 5 leads but no attempt is made in the drawings to show any lay-out of ducts or valves since the usual practice in this respect may be followed.

The chassis is long enough to accommodate a driver's seat, engine, etc., but such parts are also omitted from the drawings as unnecessary for an understanding of the invention.

Extending across the chassis and fast to the side rails thereof beneath the front end of the tank 2 is a cross beam made up of spaced channels 6, best shown in Figs. 6 and 7. The front cross beam made up of the channels 6 has the channels separated by spacer blocks 7 placed near the ends of the beam and traversed by bolts 8 also traversing the webs of the channels.

The front cross beam has attached thereto a saddle 9 connected by bolts 10 to the top flanges of the channels and projecting beyond the opposite ends of the channels. The top of the saddle 9 is curved in conformity with the cross sectional curvature of the tank 2 and receives and supports the tank. The front cross beam, made up of the channels 6, and the saddle 9, forms a bolster for sustaining the front end of the tank.

At some distance from the rear end of the chassis, the chassis rails 1 carry channels 11 separated by spacers 12 and connected by bolts 13 traversing the webs of the channels and the spacers 12. Midway of the length of the rear beam made up of the channels 11 are reinforcing plates 14 made fast to the outer faces of the webs of the channels and secured to the channels by rivets 15 or in any other suitable manner. Traversing the webs of the channels 11 and also the reinforcing plates 14 are the reduced ends 16 of a pivot or rocker pin 17. Mounted on the larger portion of the pin 17 is a cradle composed of two plates 18 spaced apart, where traversed by the pin 17, by a spacer block 19. The plates 18 rise above the tops of the channels 11 composing the rear cross beam and their upper edges are curved in conformity with the curvature of the tank 2 which latter rests upon the plates 18 and upon angle strips 20 of like curvature secured to the plates 18 by rivets 21 or otherwise. One web of each angle strip 20 is made fast to a corresponding plate 18 while the other webs of the angle strips stand out oppositely from the plates 18 to provide a relatively broad support for the tank.

The cradle made up of the plates 18 and the rear cross beam made up of the channels 11 are capable of relative rocking movements, with the pin 17 in the axis of such movement.

To hold the tank 2 in firm connection with the front bolster, straps 22 are made fast to the front cross beam by certain of the bolts 8. The straps are carried upwardly from the bolts about the sides of the tank close to the front end thereof and terminate in threaded extensions 23 passed in opposite directions through a connecting lug 24 similar in nature to the lugs employed for the hoops of water tanks composed of wooden staves. The lug 24 is provided at one end with an upstanding flange 25 to which operating devices for a pump 26 indicated in dotted lines in Fig. 2, may be attached. These operating devices are not shown since they form no part of the present invention and are only mentioned because the lug 24 is used both to join the straps 22 and to support operating parts of the pump by which the oil or other liquid may be forced from the tank as desired.

Other straps 27 are connected to bolts 28 at the opposite ends of the cradle plates 18 and these straps are continued upwardly about the tank to the top thereof where they are connected together by a lug 29 similar to the lug 24, except that no flange is provided on the lug 29. These straps are located approximately two-thirds the length of the tank from the front end.

At appropriate points along the channel rails 1 are stools 30 carrying cross arms 31 having their ends projecting beyond the sides of the chassis and there supporting a foot-board 32, there being a foot-board on each side of the structure. This foot-board is designed to accommodate persons operating the vehicle and attending to the tank, and may, if desired, be provided with a hand rail but such hand rail is not shown in the drawings. Each cross arm 31 conforms generally to the shape of the under surface of the tank but does not touch the tank, a small clearance indicated at 33 being provided.

When the truck is passing along a roadway the chassis is naturally subjected to various twisting strains due to unevennesses in the roadway. The front end of the tank is firmly attached to the corresponding portion of the chassis and participates in all rocking and other movements of the chassis at such point. At the rear cross beam the one point attachment consisting of the pivot pin 17 permits relative rocking movements between the cross beam near the rear portion of the tank and the cradle carrying the rear portion of the tank and in turn carried by the rear cross beam. If the front of the chassis rocks about an axis longitudinal of the vehicle the tank will correspondingly rock and the cradle carrying the rear portion of the tank will give about an axis longitudinal of the vehicle without the rear portion of the chassis rocking in conformity with the front portion thereof. When the rear portion of the chassis rocks without corresponding rocking of the front portion of the chassis the tank does not rock but the rear cross beam rocks without the rear cradle participating in such rocking, this being permitted by the supporting pin 17.

The result is that when the tank vehicle is traveling along a roadway there is ample flexibility between the tank and chassis permitting each to have a certain amount of movement independently of the other. Therefore, the flexibility of construction avoids any liability of undue strains being put either on the tank or the chassis. Furthermore, the flexible mounting of the tank on the chassis permits the employment of a welded tank instead of lapped and riveted seams in the tank. A tank with welded seams is found, in practice, to offer advantages over one having lapped and riveted joints in that, among other things, the tank body being practically homogeneous throughout is not subject to leakage.

What is claimed is:

1. In motor truck construction, a chassis, a tank extending lengthwise of the chassis, a bolster on the chassis underriding and supporting one end of the tank near one end of the chassis, and a cradle underriding and supporting the tank near at a point between its center and its other end, said cradle having a pivotal connection with the chassis intermediate of the ends of the cradle and of the width of the chassis, the pivotal connection extending lengthwise of the tank and the chassis.

2. In motor truck construction, a chassis provided with side rails, a tank extending lengthwise of the chassis, a bolster on the chassis underriding and rigidly supporting one end of the tank near one end of the chassis, and a cradle underriding and supporting the tank at a point between its other end and its center and means for pivotally connecting the cradle to the chassis intermediate of the ends of the cradle and in the upright plane of the longitudinal midpoint of the said chassis, the pivotal connection extending lengthwise of the tank and the chassis.

3. In motor truck construction, a chassis, a cross beam on the chassis near the front end thereof, a saddle fast to the cross beam, an elongated tank mounted on and sustained by the saddle at the front portion of the tank, another cross beam on the chassis at a point remote from the first-mentioned cross beam, and a rockable cradle carried by the second-named beam and underriding and sustaining the tank between the center and the rear end thereof, and a pivotal connection between the cradle and the second beam, said pivotal connection extending lengthwise of the tank and chassis, whereby the tank and chassis are flexibly connected to yield without strain to inequalities in the surface over which the motor truck travels.

4. In motor truck construction, a chassis, a cross beam on the chassis near the front thereof, a saddle fast to the cross beam, an elongated tank mounted on and sustained by the saddle at the front portion of the tank, straps connected to the beam and encircling the front portion of the tank to hold it in the saddle, another cross beam on the chassis at a point remote from the first-mentioned beam, a rockable cradle carried by the second-named beam and underriding and sustaining the tank between the center and the rear end thereof, and straps connected to the cradle and encircling the tank to hold the tank on the cradle, whereby the tank and chassis are flexibly connected to relatively yield without strain to inequalities of the surface over which the motor truck travels.

5. In motor truck construction, a chassis, provided with side rails, a cross beam on and extending between the side rails near the front of the chassis and composed of spaced channels, a saddle extending lengthwise of and connecting the channels, an elongated tank mounted on and sustained by the saddle at the front portion of the tank, another cross beam on and extending between the side rails of the chassis at a point remote from the first-mentioned cross beam and composed of spaced channels, a rockable cradle mounted on the second-named cross beam between the channels and underriding and sustaining the tank between the center and the rear end thereof, a pivotal support carried by and extending between the channels of the second-named cross beam and also extending through the cradle at an intermediate point of the latter, a holding strap connected to the first-named cross beam and encircling the front portion of the tank, and another holding strap connected to the ends of the cradle and encircling the rear portion of tank, whereby the tank is flexibly connected to the chassis to yield without strain upon either the chassis or tank to inequalities in the surface over which the motor truck travels.

6. In motor truck construction, a chassis provided with side rails, a cross beam mounted on the side rails near the front end thereof, a saddle fast to the cross beam, an elongated tank mounted on and sustained by the saddle at the front end of the tank, said saddle conforming to the shape of the bottom of the tank, another cross beam on the chassis at a point remote from the first-mentioned cross beam, and a rockable cradle carried by the second-named beam and also conforming to the shape of the bottom of the tank and sustaining the tank between the center and the rear end thereof, and a pivotal connection between the cradle and the second beam, said pivotal connection extending lengthwise of the tank and chassis, whereby the tank and chassis are flexibly connected to yield without strain to inequalities in the surface over which the motor truck travels.

7. In motor truck construction, a chassis, a tank extending longitudinally of the chassis, a bolster for sustaining the front end of the tank, straps rigidly connecting the tank at both sides to the bolster, a cross beam mounted on the chassis at a point remote from the bolster, a rockable cradle mounted on said beam and underriding and sustaining the rear portion of the tank, means for holding the tank on the cradle, and a pivot connecting the cradle to the beam and located in the longitudinal line of the tank and chassis, the straps and the pivot providing effectively a three-point connection of the tank to the chassis.

8. In motor truck construction, a chassis, a tank extending longitudinally of the chassis, a bolster for sustaining the front end of the tank, said bolster including a saddle shaped to fit the bottom of the tank, means for rigidly connecting the tank at each side to the bolster, a cross beam mounted on the chassis between the center and the rear end of the tank, a rockable cradle mounted on said beam, and shaped to fit the bottom of the tank and underriding and sustaining the same, means for holding the tank on said cradle, said beam including spaced channels between which the cradle moves, and a pivot connecting the cradle to the channels, said pivot being arranged in the longitudinal central line of the tank and chassis.

9. In motor truck construction, a chassis, and a tank carried by and extending longitudinally of the chassis and elevated above said chassis, said tank having at one end a rigid support extending from side to side of the chassis and fixed thereto and that portion of the tank between the center and the rear end having a pivotal support on the chassis elevated above the latter with its pivotal axis in the upright plane of the longitudinal mid-line of the chassis, whereby the tank has a three point connection with the chassis above the latter.

10. In motor truck construction, a chassis provided with side rails, a cross beam fastened on and extending between the side rails near the front of the chassis and composed of spaced channels, a saddle extending lengthwise of and connecting the channels, an elongated tank mounted on and sustained by the saddle at the front portion of the tank, another cross beam fastened on and extending between the side rails of the chassis at a point remote from the first-mentioned cross beam and composed of spaced channels, a rockable cradle mounted on the second-named cross beam between the channels and underriding and sustaining the tank between the center and the rear end thereof, and a pivotal support carried by and extending between the channels of the second-named cross beam and also extending through the cradle at an intermediate point of the latter.

11. In motor truck construction, a chassis provided with side rails, a cross beam mounted on the side rails near the front of the chassis, a saddle extending lengthwise of the beam, an elongated tank mounted on and sustained by the saddle at the front portion of the tank, another cross beam mounted on the side rails at a point remote from the first-mentioned beam, a rockable cradle mounted on the second-named cross beam and underriding and sustaining the tank between the center and the rear end thereof, a pivotal support carried by the second-named cross beam and also extending through the cradle at an intermediate point of the latter, and holding straps for the tank, said straps being secured to the first cross beam and to the cradle.

In testimony that I claim the foregoing as my own, I have hereto affixed my signature.

WALTER A. KYSOR.

Witnesses:
A. E. BURKE,
N. P. LUND.

Corrections in Letters Patent No. 1,342,266.

It is hereby certified that in Letters Patent No. 1,342,266, granted June 1, 1920, upon the application of Walter A. Kysor, of Cadillac, Michigan, for an improvement in "Motor-Truck Construction," errors appear in the printed specification requiring correction as follows: Page 3, line 13, claim 1, strike out the word "near;" same page, line 93, claim 5, after the word "of" insert the article *the*; and that the said Letters Patent should be read with these corrections therein that the same may conform to the record of the case in the Patent Office.

Signed and sealed this 6th day of July, A. D., 1920.

[SEAL.]

M. H. COULSTON,
*Acting Commissioner of Patents.*

Cl. 280—5.